United States Patent [19]
Konar et al.

[11] Patent Number: 5,825,645
[45] Date of Patent: Oct. 20, 1998

[54] TWO-LEVEL SYSTEM IDENTIFIER APPARATUS WITH OPTIMIZATION

[75] Inventors: Ahmet Ferit Konar, Circle Pines; Tariq Samad, Minneapolis, both of Minn.

[73] Assignee: Honeywell Inc., Minneapolis, Minn.

[21] Appl. No.: 441,238

[22] Filed: May 15, 1995

Related U.S. Application Data

[63] Continuation of Ser. No. 110,626, Aug. 23, 1993, abandoned, which is a continuation of Ser. No. 643,595, Jan. 22, 1991, abandoned.

[51] Int. Cl.$^6$ .................................................... G05B 13/02
[52] U.S. Cl. ............................ 364/148; 364/164; 395/23
[58] Field of Search ..................... 364/148–151, 364/158–164; 399/21–24, 903–906

[56] References Cited

U.S. PATENT DOCUMENTS

| | | | |
|---|---|---|---|
| 4,858,147 | 8/1989 | Conwell | 364/148 |
| 4,972,363 | 11/1990 | Nguyen et al. | 364/148 |
| 5,023,045 | 6/1991 | Watanabe et al. | 364/148 |
| 5,111,531 | 5/1992 | Grayson et al. | 364/162 |

*Primary Examiner*—Reba I. Elmore
*Assistant Examiner*—Thomas E. Brown
*Attorney, Agent, or Firm*—John G. Shudy, Jr.

[57] ABSTRACT

An apparatus for identifying the structure and estimating the parameters in the structure of a controlled system is described. The apparatus uses a structure identifier, in a preferred embodiment, employing a neural network, to match the relationship of the system inputs and outputs to a mathematical relation. This identified structure is communicated to a parameter estimator. The parameter estimator may employ a neural network to give an initial parameter vector which can be used to generate, iteratively, better parameter estimates. This increases the efficacy of the parameter estimator. The apparatus can be inserted into controllers for various systems to improve performance. Using a neural network for parameter estimation as shown can be generalized to any nonlinear optimization problem.

16 Claims, 6 Drawing Sheets

TWO-LEVEL SYSTEM IDENTIFIER APPARATUS WITH OPTIMIZATION

This application is a continuation of application Ser. No. 08/110,626, filed Aug. 23, 1993 now abandoned which continuation of application Ser. No. 07/643,595, filed Jan. 22, 1991 now abandoned.

This invention relates to a field of system control, and more particularly, to structural identification and parameter identification, and the use thereof in system controllers.

BACKGROUND

The identification of model structure and parameters for an unknown or incompletely known process system is important for both control and diagnosis. The more accurately a plant or process can be identified, the better it can be controlled. Estimates of system parameters are an essential aspect of adaptive/predictive control and auto-tuning. In addition, changes in system parameters or structures can be valuable diagnostic indicators. For example, a sudden increase in the delay of a transport process can imply a rerouted pipeline.

System identification continues to be the object of extensive research in control theory. A number of techniques have been developed and many are in widespread use. Most current approaches to system identification can be characterized as "hard knowledge" approaches, which means they have been derived through extensive mathematical analysis. Where they are applicable, these techniques can provide extremely accurate results.

A shortcoming of many current system identification approaches is a consequence of their strength. The assumptions that were necessary to facilitate the mathematical analysis and/or to keep the computational requirements tractable for a particular application may not be valid for other applications. The generality and ease-of-use of many current approaches is limited.

An alternative conception of a system identification tool provides greater generality of application. Such a general-purpose tool or technique can be used for a large variety of system identification problems with little or no mathematical effort by the engineer of ordinary skill. Where special-purpose techniques exist, they might well perform more accurately, however, the short development time that a general-purpose technique may allow while still satisfying performance requirements can be a significant advantage.

System identification tools and techniques can have wide applicability, e.g.:

Definite needs by engineers in process industries to obtain a better knowledge about their plants for obtaining improved control. This is true for the chemical, mechanical, and other production environments.

The study of high performance aero and space vehicles, as well as of the dynamics of more down-to-earth systems such as railway carriages and hydrofoils can be improved using these tools and techniques.

The study of the human being in tracking action and in other types of control can be enhanced.

Research in biological functions, e.g., into neuromuscular systems like the eye pupil response, arm or leg control, heart rate control, etc., can also be improved using these tools and techniques.

When formulating and solving an identification problem, it is important to have the purpose of the identification in mind. In control problems, the final goal is often to design control strategies for a particular system. There are, however, also situations where the primary interest is to analyze the properties of a system. Determination of rate coefficients in chemical reactions, heat transfer coefficients of industrial processes and reactivity coefficients in nuclear reactors are typical example of such a "diagnostic" situation. In such a case, determination of specific parameter values might be the final goal of the identification. Many problems of this type are also found in biology, economy and medicine.

Even when the purpose of the identification is to design a control system, the character of the problem might vary widely depending on the nature of the control problem. A few examples are given below:

Design a stable regulator.

Design a control program for optimal transition from one state to the other.

Design a regulator which minimizes the variations in process variables due to disturbances.

Thus, the present invention can be seen to have wide applicability. Nevertheless, we employ a common control environment to ease explanation, without any intention of so limiting the applicability of this invention.

Thus, in building a model to regulate or control a system or process such as, for example, a heating ventilation and air conditioning system for a building, or the production line of a chemical factory, or of some other automated or semiautomated facility, various techniques have been used in the past. The model of the system is based on the relationship between the inputs to the systems and the outputs, or responses, identified within or from the system by sensors or other monitors of the system's activities. For example, turning up the boiler in the furnace room would increase the heat in the room at different rates depending on various other conditions within the monitored environment of the room. The response, measured as a change in temperature in the room plotted against time, will generate some kind of curve. The shape of the curve, the slope of the upward response, and the order of the equation which defines the curve can each vary considerably depending on the nature of the monitored environment.

Most current system identification approaches prior to this invention do not specifically identify the structure of the system, even though it is basic to the relationship between the inputs and the outputs. One common approach is to assume the most complex structure possible or likely, based on a human analysis of the system. All parameters of all the predetermined blocks [such as delay, integral, lag, lead-lag] in the system must, under this approach, be identified. In another approach, an iterative process is used wherein successively more complex structures are assumed and parameter identification is performed until an acceptable match with the actual process data is obtained.

In both these prior methods an additional computational burden is carried by the identification method due to the lack of an appropriate structure identifier. Therefore, the search space is likely to be large and the process of identifying the system is likely to take a long time. The identification software would therefore require substantial memory resources for a substantial period of time and the accuracy of the parameter identification, based on one of the above-described methods, is likely to be poor.

Prior to this invention, automatic structure identification approaches that can work for real-world problems have not been available. For this reason, the literature tends to confuse the words "system identification" with parameter estimation. However, recent work in neural networks has shown that some neural network models can provide automatic means of developing complex, nonlinear, multidimensional mappings from examples of relationships between sets of variables in given situations. This can be done with little problem analysis or manual programming.

Neural networks, however, have their own drawbacks. They are generally time consuming and computationally expensive, particularly in the training phase, and particularly if the neural network model is implemented in software on a single processor and does not have a dedicated hardware implementation. However, as neural network processing becomes less expensive, it may be useful to use the neural network for the parameter identification as well as the structure identification.

SUMMARY OF THE INVENTION

The two-level system identifier of this patent employs a neural network as a pattern classifier to solve the structural identification problem. It uses modern algorithmic techniques to estimate the parameter values corresponding to the identified structure.

It may employ a neural network for the parameter estimation. Initial parameter values may also be determined using a neural network. Continued parameter optimization of an on-line system is also taught. Finally, a description of continued on-line tuning or training, using optimization data, is described.

DETAILED DESCRIPTION OF THE PREFERRED EMBODIMENT

The science of controlling systems has applications in many fields and substantial scientific and technological history as described briefly in the Background section above.

To present some concepts, we will refer to a particular example, an HVAC system. An HVAC system (Heating, Ventilating and Air Conditioning system) is applicable to a generally closed building space and responds to a human operator who controls the setpoints, or maybe just the temperature and windows for ventilation (and possibly curtains for modification of heat loads from sunlight and prevention of heat loss through the windows). The human turns the system off and uses his window controls during seasonable temperatures, keeping the air conditioning on and the curtains closed at the hottest times, and the heat on and the curtains closed at the coldest times. He generally will move the setpoint up when he feels cold and the setpoint down when he feels hot. The setpoint, as determined on the thermostat which is in the room that the human controls, either provides input directly to the boiler, ventilating system and air conditioning, or goes through an intermediary, a controller, which will provide the same inputs to the mechanical equipment, but in a more efficient manner than the human could do so. For the purposes of this patent, only the case where a controller is used is relevant.

Figure 1:
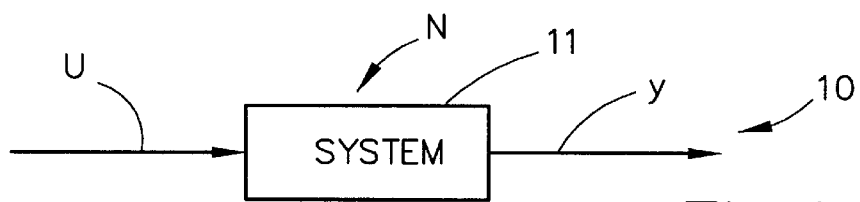
FIG. 1 is a conceptual block diagram of a basic open-loop control system.

Referring first to FIG. 1, a system 11 is shown having inputs "u" and "N" going into the system, and outputs "y" coming out of the system. Comparing this to the controlled building space of the example explained above, the "u" going into the system would be the heat delivered by the furnace, the coolness delivered by the air conditioner, and the rate of flow at which the ventilation (or other delivery) system delivers either of these inputs. The output from the room, "y", is (in the example) the measured temperature which changes because of the inputs "u". In the room there are uncontrolled inputs, or inputs that are controllable through means other than that available through the thermostat. These inputs are called "N" (for "noise") and, in the case of the room described above, may include changes in the curtain operation and the window operation by the human in the room, clouds affecting sun-load, etc. Thus, the system 10 is identified in a qualitative manner. The human may effect inputs "N" without going through the controller, and inputs "u" through the controller and, if present, will do so in response to changes in the system which affect him. The thermostat also monitors "y" and can effect its own changes to "u" to cause "y" to match the setpoint.

(It should be noted that references to variables u and y and others may imply reference to vectors throughout this specification. It is believed that the context makes clear the usage of any particular named variable).

Figure 2:
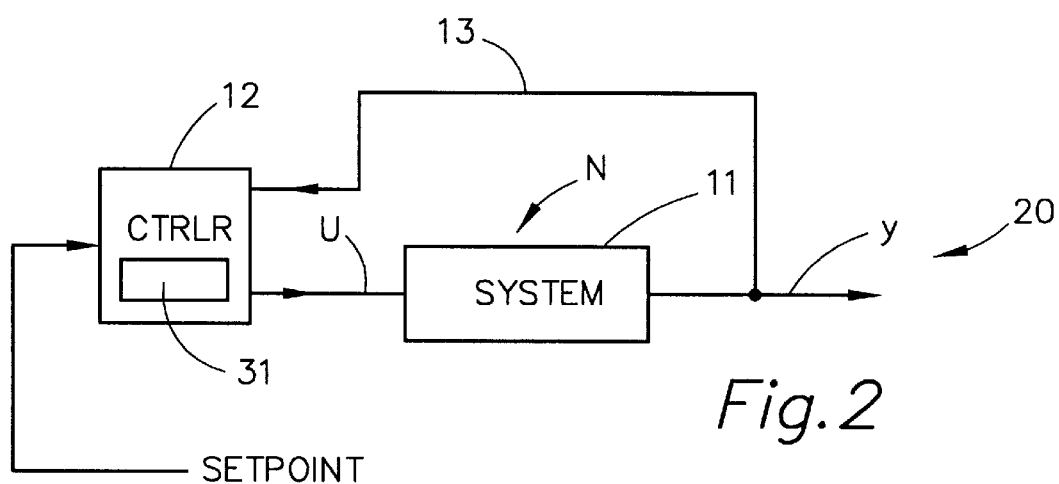
FIG. 2 is a block diagram of a basic closed-loop control system.

In FIG. 2, a closed-loop system 20 is described, having a system 11, noise inputs "N", controllable inputs u, controlled outputs y, and a return loop 13 which returns y to the controller 12. The controller may or may not contain a model 31.

Figure 3:
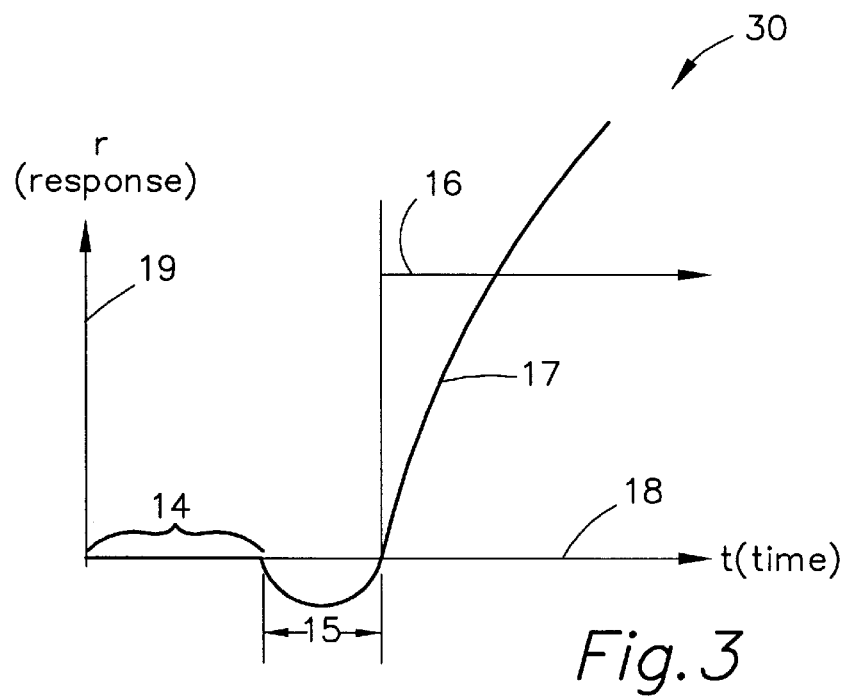
FIG. 3 is a plot of a response curve against time.

Referring now to FIG. 3, a graph 30 of the response curve 17 plotting the response 19 (of y) against the time 18, is shown. The space 14 indicating the time between the moment the controller sends signals to the machinery to deliver modified outputs u to the system and the moment at which the response is affected by the controller output u, indicates that the response in this curve has what is called "dead time" or "delay". Thus, if it is a boiler which is being controlled, the time from which the signal is given to the boiler to the time at which the temperature of the room is affected, is called "dead time". The droop in curve 17 indicated in the time region 15 indicates an inverse response in the response curve. This may happen where a blower goes on and cools the room somewhat before heat is delivered, for example. The remaining part of the curve 17 is an upward sloping curve in time area 16. This part of the curve is called the "integral action" of the response curve.

A response curve such as this curve 17 may be produced by a single step change in setpoint in a system. Not every response curve will have the same features as this one, of course, and the response curve of room-measurable features such as humidity, rate of air flow through the room, etc., may be quite different in response to the same set of inputs into the room. For example, the slope of part 16 of curve 17 may flatten dramatically on a very hot day, if a relatively low power air cooling system is employed, or may remain quite similar, if the air cooling system is quite strong.

For the exercise of this invention, a mathematical model of a system is necessary. The model can exhibit variations in two ways. First, structural variations are possible. Possible structural variations can include:

Different compositions of subfunctions (such as delay, lead-lag, lag, etc.).

Different orders of denominator and numerator polynomials in a transfer function model.

Different kinds of nonlinearities (e.g., saturation, hysteresis, logarithmic, exponential) in a nonlinear mathematical model.

Second, the mathematical model can contain parameters which can be assigned different values. For example, when a system contains a delay, the actual value of the delay can be a parameter.

Figure 9:
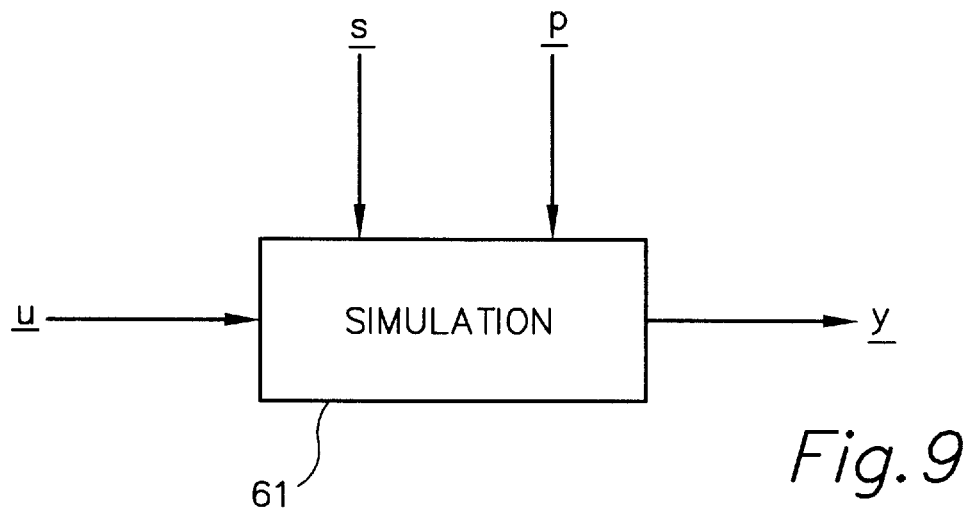
FIG. 9 is a block diagram of system simulation.

Development of a structure identifier can be explained with reference to FIG. 9, in which a simulation model 61 is shown. The model can be a set of algorithms, programs, or even an analog device, if desired.

Generation of training data is accomplished using the model 61. "s" is a structural representation (e.g., switch settings). s is a vector; the structural representation in general will not be just one scalar number. s is not at all related in any way to the s of a transfer function (e.g., H(s)=. . . ).

In the general case, various u, s, p, are input to the simulation, and corresponding y are produced. Each u, s, y constitutes one training example (p is not needed for training the structure identifier. The network is then trained as follows (for each training example) with reference to FIG. 10.

Figure 10:
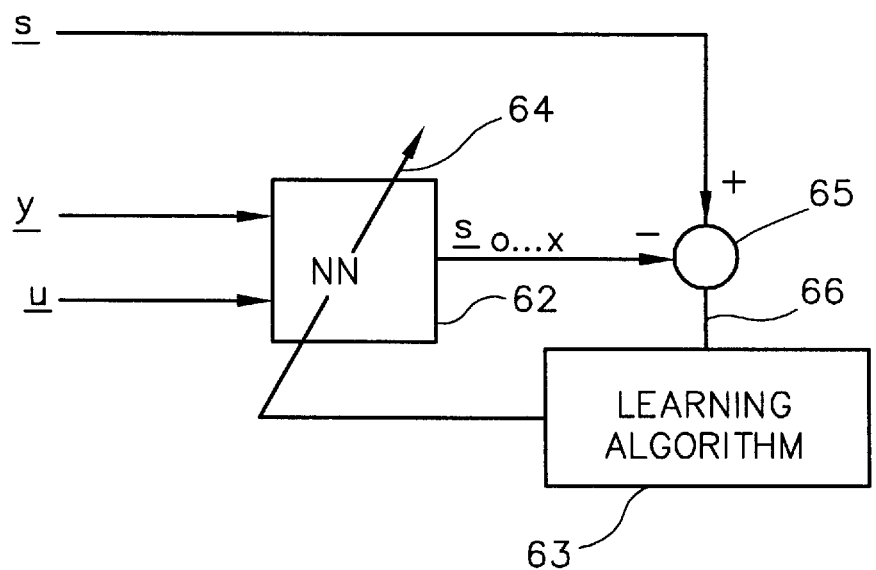
FIG. 10 is a block diagram of neural network training.

In FIG. 10, a neural network 62 has associated with it a learning algorithm 63 as described previously in the appendix. Diagramatically, the arrows 64 represent the algorithm's ability to adjust the neural network, whether by adjusting internal weights or by other means. Inputs y and u passing through the network 62 produce an output $s_0$, which is compared with s at point 65. The learning algorithm uses the comparison received on line 66 to accomplish modification through representative arrow 64. The process is iteratively repeated until $s_0$ . . . x is sufficiently close to s so as to be negligible in context or minimized.

It should be noted that if a particular u will always be used, it need not be provided as specific input to the network, either during training or operation.

The development of a training set for a parameter estimation used to estimate delay is described in some detail in U.S. patent application Ser. No. 07/594,927, filed Oct. 10, 1990, incorporated herein by reference, and included as an appendix hereto. Similar training sets may be generated for the present application but input, output and corresponding structural values should be used rather than input, output and corresponding parameter values as in the referenced application. Therefore $u_p$, $y_p$ and structural switch settings should be the kinds of data relevant to the neural network training used for structural identification.

In short, various model descriptions can be randomly or thoughtfully generated, and input parameters applied to them in simulation to generate response curves for each model.

Generation of training sets and use of simulators for these purposes is well understood and various techniques and simulators may be used. The neural network must be one which is capable of non-linear function mapping. Two examples would be networks that are of the back-propagation or radial-basis function types.

The input parameters themselves may be random or carefully generated to match expected actual parameters if desired. It is probably helpful that some noise, either random or periodic, or some combination, be introduced into the simulation for robustness. Closed-loop, nonstep input, and even arbitrary inputs can be used, as well as a basic open-loop step input model. The more variety of models in the simulator used to create the training data set, the more likely the system identifier is to select an accurate model for the system intended to be controlled in the real world. Of course, the more complexity introduced, the more costly the running of the network and the simulations is. Therefore, where the process can be accurately described as open-loop, step input, such a basis for training should be used.

Thus, the training set of data should be compiled with a simulator which has been constructed with reference to the real world situation that the controller having the two-level system identifier will find itself employed in. Real world examples could be used instead, of course, but the compilation of such data would be tedious, prone to error, costly, and quite time consuming.

As in the earlier referenced application which described the performance of a system identifier for parameter estimation, specifically making an example of the delay parameter, the training of the neural network requires that corresponding inputs and output(s) are fed into the network, iteratively, until the output from the neural network matches the output(s) which correspond to those inputs from the given example. This technique and concept or tool is employed in this invention as well. It is, however, put to different purposes.

The description which follows will be segmented into the following sections of explanation. System Identifier, Parameter Estimator, Initial Parameter Estimator, and Optimization with Memory.

The inventions described herein have been implemented on HP/Apollo workstations in the FORTRAN and C programming languages. Several successful demonstrations have been conducted. The system designer can select his own implementation platforms without deviating from the teachings of this patent. Obviously, where larger neural network processing capability is required, machines and languages more closely adapted to neural network processing should be preferred.

System Identifier

Figure 4:
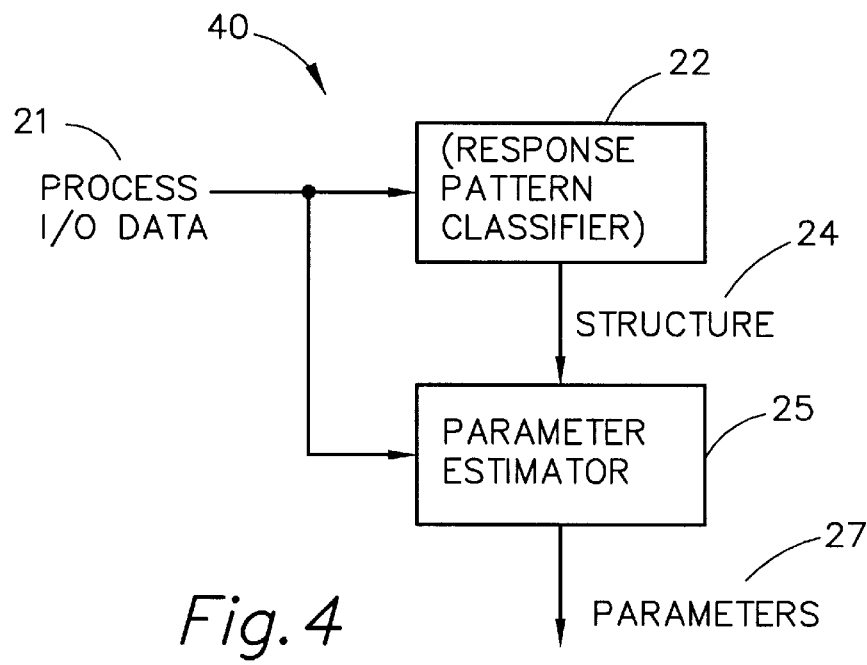
FIG. 4 is a block diagram of the basic elements of the two-level system identifier.

Referring first to FIG. 4, in which a general description of the two-level system identifier 40 is shown, process input and output data 21 is input to a response pattern classifier 22 and a parameter estimator 25. In general, the response pattern classifier 22 provides the structure identification for the system under consideration. A transfer function representative of the structure identified 24 is input from the response pattern classifier 22 to the parameter estimator 25. The parameter estimator uses the model identified in the transfer function 24 to find initial values of the parameters 27 associated with said transfer function, and iteratively process these parameters through its internal processes until the actual process input and output data 21 match the process input and output data which would be predicted using the parameters estimated in the identified structure.

The transfer function in which the structure 24 is identified to the parameter estimator 25, can be viewed as a series of structural switches in one embodiment. Before describing the transfer function or structural identification 24 in general terms, reference should now be had to FIG. 6, in which the structural switches 31, 32, 33 and 34, which make up the structural identification of the system 30, are shown. The inputs U(s) may be applied directly to the gain factor 35, to yield the output Y(s). U(s) and Y(s) are the Laplace transforms of the time-varying input and output signals, u(t) and y(t), respectively. Gain is generally represented as $K_p$. If the relationship between the inputs and the outputs in the training data set indicates that there is a delay, the inputs U(s) will instead be applied through switch 31 to the delay function in box $S_D$. If there is no delay, switch 31 will direct inputs U(s) around the delay function where they will be directed by switch 32, either around or through the lead-lag parameter function indicated by box $S_{LL}$. The process is repeated for switch 33 and box $S_L$, and switch 34 and box $S_I$, the lag and integral functions respectively. Thus, if all the switches go through the function boxes, the system is identified as having a response curve with delay, lead-lag, lag, and integral. The order of the switches may, of course, be changed if desired without any harm to the overall working of the identification process. It will be noted that there is no switch before the gain box 35 because the gain function is believed to be present in all structural formulas.

It should be noted that the structure identification described above is merely one embodiment. The structure can be described or identified in other ways. But these other ways must correspond to the acceptable inputs to the parameter estimator used. For example, if the response pattern classifier were to pass merely the order number of the equation which describes the response patterns found in the training data set, a parameter estimator could be constructed to use these numbers to generate the equation which describes or identifies the structure of the system from a limited set of equations contained within the parameter estimator. Likewise, other ways may be used to describe the transfer function, such as $H(s)=b_0s^m+b_1s^{m-1}+\ldots b_m$, where a and b are $$H(s) = \frac{b_0 s^m + b_1 s^{m-1} + \ldots b_m}{s^n + a_1 s^{n-1} + \ldots a_n}$$

parameter vectors, but in this form, cannot be called common parameter names such as delay, lead-lag, etc., and where n and m are the polynominal degrees of H(s). (H(s) is a transfer function.)

Figure 6:
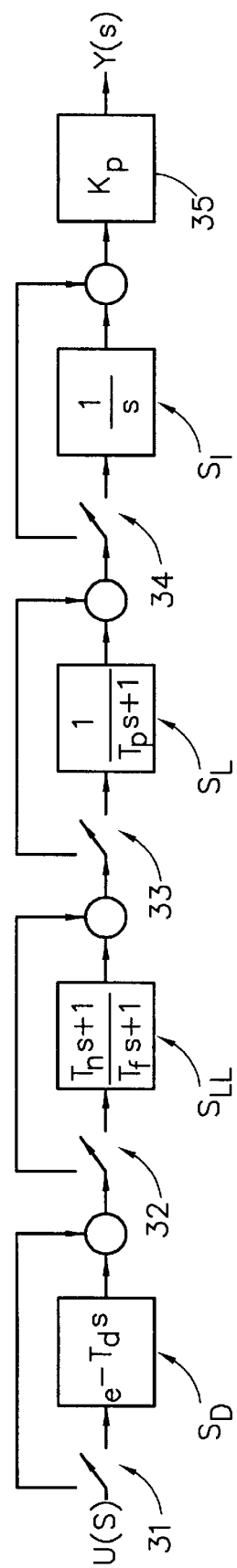
FIG. 6 is a block diagram of a series of switches and structured blocks/components of a system.

The structural switches identified in FIG. 6, however, describes a reasonable universe of structures to be considered for many control applications and thus is the preferable form to use.

Figure 7:
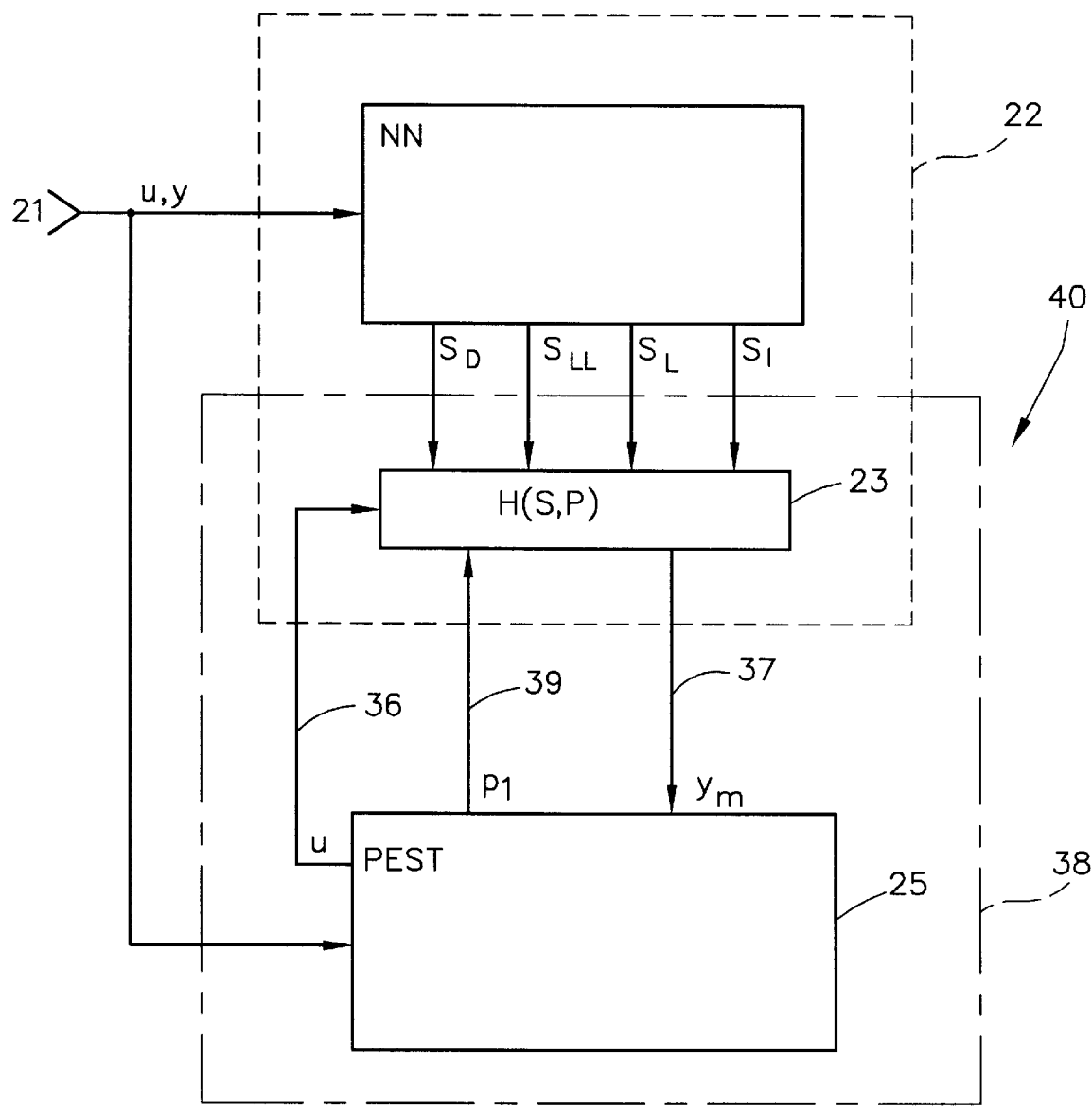
FIG. 7 is a block diagram of a structure identifier and a parameter estimator.

Reference should now be had to FIG. 7, in which the structure identifier or response pattern classifier 22 is shown in dotted line, containing a neural network NN, having switches $S_D$, $S_{LL}$, $S_L$, $S_I$, on the outputs similarly denominated in the drawing. Thus, the systems process input and output data 21 passed through the neural network NN, and, in one embodiment, provides binary on or off outputs through the switches $S_X$. This then would configure the transfer function H(s,p) 23. "p" is the set of parameters associated with the identified structural blocks. (Alternatively, each part of the transfer function may be turned on or turned off, and another layer of complexity so added if desired, if construction of the device is made easier.) The parameter estimator 25 may also employ box 23 or a duplicate structure (not shown) to test the identified structure and parameters estimated and the relationship generated thereby, against the actual inputs u and outputs y (21). As is common practice, the actual time-varying inputs and outputs u(t) and y(t) are sampled, and the sampled vectors u and y are provided as input to the system identification method described herein. Thus, the parameter estimator comparator 38 receives inputs u and outputs y (21), and employs input u over line 36 as input to box 23. At the same time, it supplies the last best estimate of parameters (these are identified as the vector p) across line 39. This yields an output on line 37 of $y_m$. This output $y_m$ is the y determined by the model. It is compared in box 38 to the u input on line 21.

Thus, in the embodiment 40 shown in FIG. 7, system identification is accomplished by setting a series of switches $S_x$ by a neural network NN. The switches are set in response to inputs u and y from line 21. The setting of the switches generates a formula or transfer function which identifies the structure of the system by a software or hardware implementation of box 23. (Software implementations are preferred for smaller and less time-sensitive applications, and hardware is preferred wherever faster processing is desired.) In this manner, the transfer function H(s,p) is provided to the parameter estimator 25. System identification is considered accomplished when the parameter estimator completes its processing.

Parameter Estimator

Still with reference to FIG. 7, the parameter estimator 25 employs the software or hardware implementation of the transfer function in box 23 by allowing or transferring u inputs over line 36 to the transfer function at the same time as it provides its first set of parameter estimates $p_1$ across line 31 into the transfer function. The output of box 23, for each u,p pair or set, produces an output on line 37, $y_m$. An explanation of the process of parameter estimation may be better described with reference to FIG. 5 than with reference to box 38 in FIG. 7.

Figure 5:
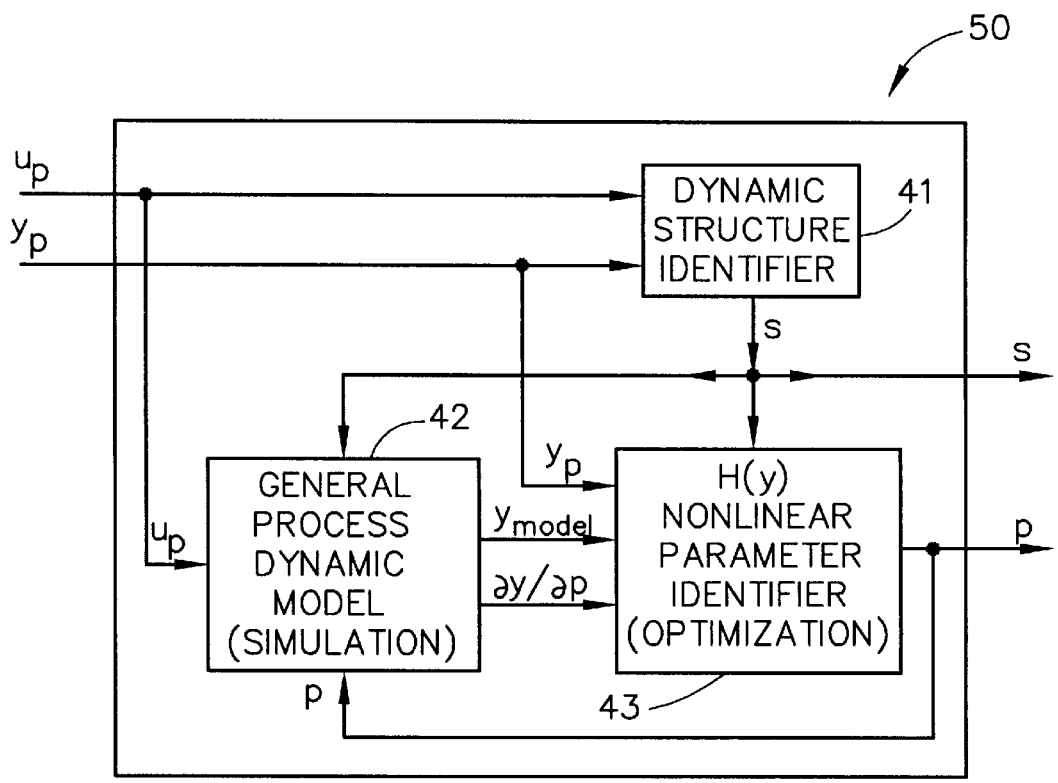
FIG. 5 is a more detailed block diagram of a two-level system identifier.

In FIG. 5, a flow diagram 50 details the inputs and outputs between the elements of the system used to identify parameters. A dynamic structure identifier 41 receives inputs from the process $u_p$ and outputs from the process $y_p$. The inputs from the process are also fed to the general process dynamic model 42 which provides the simulation function in this device. The output process data $y_p$ is also provided to the non-linear parameter identifier 43 which contains an optimization program. The dynamic structure identifier 41 provides a structural index s which is similar or identical to the transfer function described above, to the non-linear parameter identifier 43. The non-linear parameter identifier also is provided with an output from the process model 42, $y_m$. The model 42 generally produces a gradient (partial y/partial p) which can be provided to the parameter identifier 43, or generated independently within the parameter identifier if so desired. The parameter identifier produces an output "p" as a complex or multistep process. It compares the output process data "$y_p$" to the model output data "$y_m$." If these are not sufficiently close as to be negligible for purposes of whatever system is being controlled, then the gradient (either determined by box 42 and passed to box 43, or generated within box 43) is used with an optimization algorithm to generate a change in the output parameters p, calculated to more closely match $y_p$ with $y_m$. Many methods for performing this type of calculation are well known and no particular calculation method is preferred. Some produce faster results but require more computational power, so the method chosen is a matter of design choice.

The method we employed is a Levenberg Marquardt optimization algorithm modified to handle constraints. A definition of this method can be found in the work of L. E. Scales, *Introduction to Nonlinear Optimization*, Springer-Verlag, 1985. The best method for any particular use will depend on design considerations.

The output p from box 43 is provided to the model in box 42. The model employs the process input $u_p$ and passes it through the structure identified by the structure index s received from the structure identifier 41. The parameters it 42 uses are based on the optimization carried out in box 43, using the difference between $y_p$ and $y_m$, the gradient, and the last p generated to produce the next p or "p" output.

In relating FIG. 5 to FIG. 7, box 38 in FIG. 7 roughly corresponds to boxes 42 and 43. However, some part of the box 23 which contains the identified structure would logically belong in box 42 of FIG. 5.

Thus, it can be seen that several embodiments for the same pair of elements, the structure identifier and the parameter estimator, can be constructed using software or hardware. However, the parameter estimator must receive some indication of the structure identified by a structure identifier, or at least be able to operate on one to produce parameter estimates. The parameter estimates need to be fed through a model which depends also on the identified structure and the process inputs to generate model outputs. The model outputs and the process outputs must be employed by the parameter estimator to produce a new parameter estimate. The process outputs and the process inputs must both be provided to the structure identifier. With these constraints in mind, numerous embodiments may be constructed in accordance with the software and hardware construction techniques available to those of ordinary skill in the art.

Initial Parameter Estimator

As described in U.S. patent application Ser. No. 07/594,927, filed Oct. 10, 1990, incorporated herein by reference thereto, and attached as an appendix, a description of parameter estimation using a neural network is provided. It is well known that the more accurate the initial solution estimate is, the quicker any optimization technique can achieve satisfactory optimization. It has been found that substantial savings in time and costly machine cycles or processing can be achieved using good initial parameter estimates. By using the technique described in the above-referenced patent application to generate parameters, and using the technique for each of the parameters in the structurally identified system, satisfactory results have been achieved.

Figure 8:
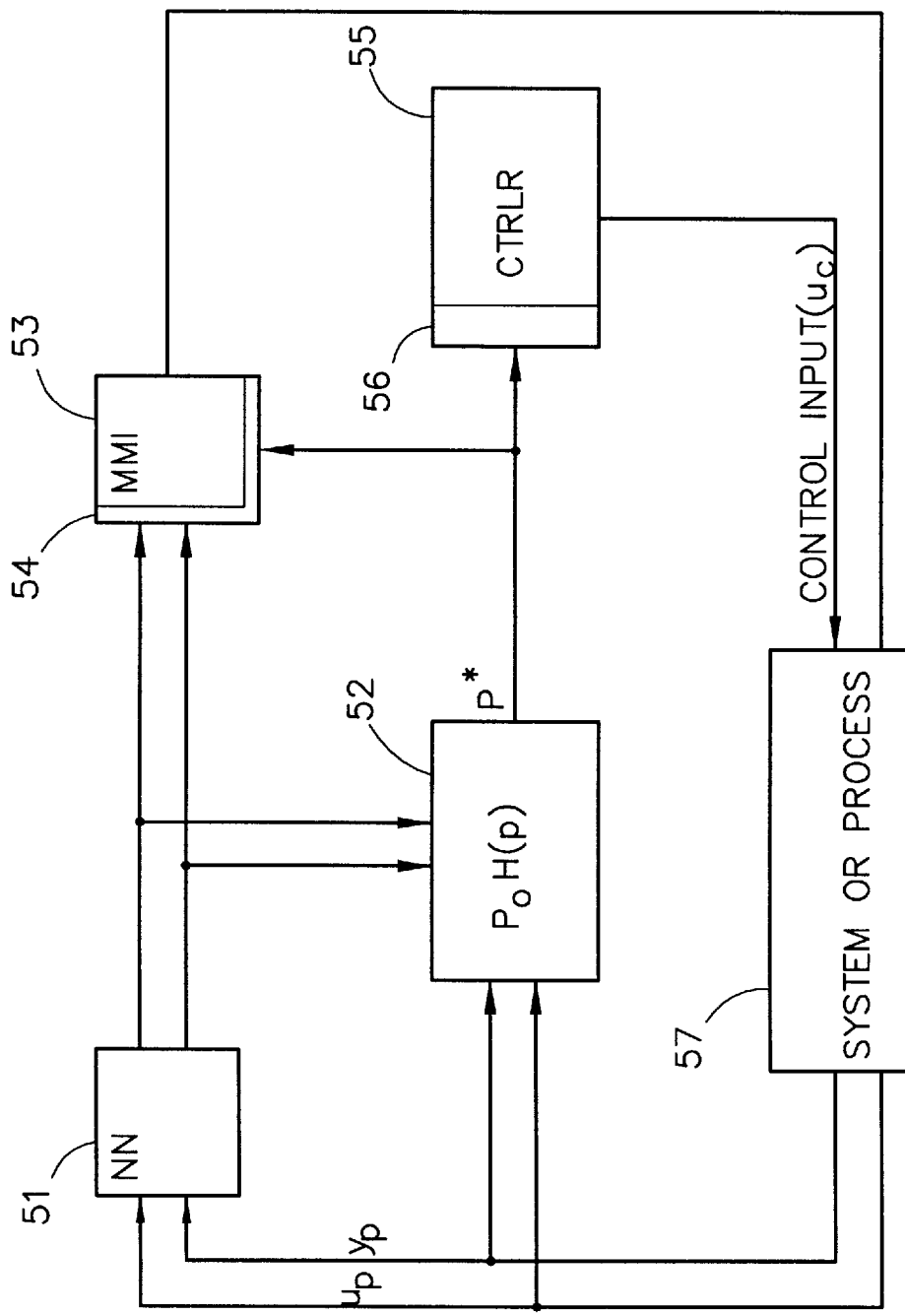
FIG. 8 is a block diagram of a controlled system.

Referring now to FIG. 8, initial parameter estimation may be described with reference to the control system and process interface diagram 60. The inputs $U_p$ and the outputs $Y_p$ are monitored in the system or process under control. These are provided as inputs to a feed-forward neural network 51, which is used as an initial parameter estimator. The same neural network can produce structural indexes s to identify the structure as outputs at the same time it provides parameter estimates p. These outputs s and p are both provided to box 52 which provides the function of non-linear optimization (a feedback or iterative type function). Box 52 also receives as inputs $U_p$ and $Y_p$.

With reference to FIG. 5, box 52 is similar to boxes 42 and 43, but has the additional input p0, which is the initial parameter estimate generated by neural network 51. Outputs s and p from box 51 may also be provided to a man-machine interface 53 for analysis if desired. Such analysis may have the purpose of improving the controller, or the system or process under control. An alarm system 54 may operate as an intelligent interface to the man-machine interface 53 if so desired. The man-machine interface 53 may have direct control inputs to the system or process (such as the man closing the drapes in the simplistic example used in the beginning of this exposition).

The controller 55 is controlled by outputs from the optimization box 52, p*. This output p* may also be provided to the man-machine interface and may also be provided through an alarm system if desired. p* is the optimized output of the portion of box 52 which is equivalent to box 43 of FIG. 5. Thus, p* the set of parameters which most exactly fits the curve that is the relation between $U_p$ and $Y_p$. These parameters are fed to the controller 55 through a translator 56, which interprets the data in the manner required by the controller to produce output $u_c$, the control inputs to the system or process under control.

On-Line Tuning of the Network

It should be noted that the input values $u_p$ and the estimated parameters (p), taken together with the results generated by the general process dynamic model 42, i.e., $y_m$ output, provides a training set consistent with real data. That is, if the simulator is equivalent to the training data generator, then this data is consistent and can be used as inputs to the neural network for enhancing and enlarging the training data set. Thus, the network itself is trainable on-line, during operation of the system. This training is most powerful when used for parameter estimation because it allows for the generation of more accurate $p_0$'s, or initial parameter values.

Optimization with Memory

Optimization problems are ubiquitous in all fields of engineering and science. Thus, the optimization techniques described herein are of broad applicability. In a general sense, optimization techniques are applicable to problems requiring the minimization (or maximization, but that is not important here) of some function E(x,p) of two variables, x and p. These variables can be either scalars or vectors of arbitrary dimensionality. In the paramater estimation application discussed above, x is the combination of the process input vector $u_p$ and the process output vector $y_p$, p is still the parameter vector, and the function E is the degree of match between $y_p$ and the model output $y_m$ computed from $u_p$ and p.

In either the specific application of system identification or more generally, we assume that x is given. The problem is then to find the value of p for which E(x,p) is minimized. For example, E can be a function such as $E(x,p) = x^2 + 2x^3 p + p^{1/2} + \sin(px)$. (In this example x and p are scalars for simplicity.)

For almost all nonlinear expressions E, the optimization of E does not have a closed-form analytic solution. Solving the problem requires iterative optimization methods. In most real cases, the dimensionality of p is also larger than 1 or 2, requiring significant computational burden which can be reduced significantly by the optimization described herein. In addition to the dimensionality of p, the computational effort required to solve a non-linear optimization problem depends strongly on the quality of the starting point or initial p estimate; $p_0$. If $P_0$ is close to the (unknown) optimal or solution point, p*, convergence of the optimization on point p* will be rapid. However, if the starting and solution points are not close, the computational resources and the time required by any optimization method to find the solution will, in many applications, be infeasibly large. Generating a good starting point given an arbitrary optimization problem is a hard problem, and in conventional optimization methods, little or no effort is expended in attempting to solve this problem. Instead starting points are typically random or arbitrary. This invention replaces this prior art one-step method with a two-step method. Different embodiments may be used for the two-step method.

The first step, of course, is to generate a good starting point: $p_0 = F^*_M(x)$. Here, the $F^*_M(x)$ is a function or mapping that produces an initial estimate of p given the vector x. The estimate can then be used as the initial value of p for the optimization method described by the question "What value of p provides the minimum for the expression E(x,p) or: p*=

$$\underset{p}{\operatorname{argmin}}$$

E(x,P). The optimization method serves as a "corrector." The key to this approach is the definition of $F^*_M(X)$. This expression itself can be realized as the result of an optimization process, where the optimization is over the space of possible functions $F_M(x)$:

$$F^*_M(\underline{x}) = \underset{F_m(\underline{x})}{\operatorname{argmin}} ||\underline{p}^* - F_M(\underline{x})|||_{\{x,p^*\}}.$$

That is, given a set of x, p* vectors, we find a function of x for which the difference between the (given) optimal value p* and the output of the function is minimized over the set. We refer to {x,p*} as the training set for this minimization problem. The training set is collected through simulation, by randomly (or through some order) selecting x vectors and using the corrector (with a random starting point), to find the corresponding p* vectors. It is important to note that the training set collection steps and the function optimization process can both be conducted off-line. Thus, within reasonable limits, the computational resources required for these activities are of little practical concern. A systematic technique for defining and exploring the rich function space that must be searched is described next.

Non-linear neural networks and supervised learning algorithms provide an attractive and efficient solution. A learning algorithm such as the back-propagation learning rule (described in Rumelhart et. al in "Learning Representations by Back-Propagating Errors", Nature 323, Oct. 9, 1986) or Radial Basis Functions (Moody and Darken, "Fast Learning in Networks of Locally-Tuned Processing Units", Neural Computations 1, pages 281–294, 1989), can be employed. These algorithms determine network parameters such as connection weights so as to minimize the output error of the network over the training set. In the equation:

$$||p^* - F_{NN}[w^*,x]||_{\{x,p^*\}} = \min ||p^* - F_{NN}(w,x)||_{\{x,p^*\}}$$

the function $F_{NN}$ is a function realized by the neural network with parameters w when subjected to an input x. Once w* is known, an initial estimate for p* can be produced analogously to the general case above. Thus, $p0 = F_{NN}(w^*,x)$. It should be noted that the w parameters are simply parameters of the neural network. They may be representative of weights for individual connections, or of other parameters, depending on the configuration of the network.

The execution speed of the trained neural network is fast, even on rudimentary hardware where the network is built on software running on the rudimentary hardware. The training algorithms, on the other hand, can be quite time consuming. However, on-line training is possible if used to fine tune a coarsely-trained network. Since the optimizer generates "consistent" x and p* vectors during its operation, this data can be reused for on-line training. The learning algorithm employed, or some other learning algorithm to be used in the field, must be fielded along with the trained network.

What is claimed is:

1. An two level system identifier apparatus for identifying both the structure and estimating uncontrollable and unmeasured parameters of a controlled system comprising:

structure identifier means for determining the structure of a function which describes the mathematical relationship of the inputs to a system and the outputs from said system, communication means for transferring the determined function structure and generating the function, the relationship and parameters, including uncontrollable and unmeasured parameters, of which describes said mathematical relationship in terms of said parameters, parameter estimator means for receiving said function from said communication means and for estimating said parameters' value.

2. An apparatus as set forth in claim 1 wherein the structure identifier means is a neural network trained on a training data set not derived using the process instrumentation or the control system.

3. An apparatus as set forth in claim 2 wherein said training data set comprises the values of inputs to said system and outputs from said system and structural descriptions, wherein said values of inputs and outputs in said training data set are produced by any of the following methods:

A) computation of outputs based on randomly generated inputs employed in said function, B) computation of outputs based on randomly generated inputs employed in randomly generated functions, C) computation of outputs based on thoughtfully generated inputs employed in said function, D) computation of outputs based on thoughtfully generated inputs employed in randomly generated functions, E) recording real world generated inputs and outputs to and from said system, and F) recording real world generated inputs and outputs to and from a test data generating system.

4. An apparatus as set forth in claim 1 wherein the function is comprised of subfunctions, each subfunction determining the relationship of a set of zero or more parameters to said function, and wherein said communication means employs a set of switches having two logical positions, wherein each switch in one position turns off and in the other position turns on the subfunction of one of said parameter sets within said function, and wherein the position of the switches is determined by output received from said structure identifier so that the position of the set of logical switches operates as a communication of the identified system structure by a connection of an output of said set of switches to said parameter estimator means.

5. An apparatus as set forth in claim 1 wherein the parameter estimator receives as input an initial parameter value.

6. An apparatus as set forth in claim 5 wherein the initial parameter value is set by the user.

7. An apparatus as set forth in claim 5 wherein the initial parameter value is set by a neural network trained on a training data set comprising inputs to said system, outputs from said system and parameter values.

8. An apparatus as set forth in claim 7 wherein said neural network is also used to generate the structure identification function provided by the structure identifier means.

9. An apparatus as set forth in claim 1 wherein the parameter estimator means comprises:

a simulator element and an optimizer element, wherein said simulator element receives input values from said system and parameter estimate values output from said optimizer element and wherein said simulator element produces an output to said optimizer element that models the system output values based on the system input values and said parameter estimates by applying these two inputs to a simulation based on the structure identified by the structure identifier means, and wherein said optimizer element receives as input, said system output values and compares this system output input to the model of the system output, and based on the error and the gradient performs an optimization of the parameter estimate to produce a new parameter estimate.

10. An Apparatus as set forth in claim 9 wherein the model output and input pairs together with the parameter estimate outputs are used as part of the training data set for the system identifier means.

11. An apparatus as set forth in claim 10 wherein the training data set is continually expanded during on-line operations so as to produce initial parameter estimates of continually increasing accuracy.

12. An apparatus as set forth in claim 10, wherein the input values are a constant step function and the input values are not provided as specific input to the network.

13. An apparatus as set forth in claim 10, wherein the input is a single fixed function and the input values are not provided as specific input to the network.

14. An apparatus as set forth in claim 3, wherein the input values are a constant step function and the input values are not provided as specific input to the network.

15. An apparatus as set forth in claim 3, wherein the input is a single fixed function and the input values are not provided as specific input to the network.

16. An apparatus for identifying the structure and estimating the parameters of a controlled system comprising:

structure identifier means for determining the structure of a function which describes the mathematical relationship of the inputs to a system and the outputs from said system;

communication means for transferring the determined function structure and generating the function, the relationship and the parameters of which describes said mathematical relationship in terms of said parameters;

parameter estimator means for receiving said function from said communication means and for estimating said parameters' value; and wherein said function is comprised of subfunctions, each subfunction determining the relationship of a set of zero or more parameters to said function, and wherein said communication means employs a set of switches having two logical positions, wherein each switch in one position turns off and in the other position turns on the subfunction of one of said parameter sets within said function, and wherein the position of the switches is determined by output received from said structure identifier so that the position of the set of logical switches operates as a communication of the identified system structure by a connection of an output of said set of switches to said parameter estimator means.

* * * * *